(12) United States Patent
Maker (10) Patent No.: US 12,121,800 B2
(45) Date of Patent: Oct. 22, 2024

(54) HAPTICS FOR TOUCH-INPUT HARDWARE INTERFACES OF A GAME CONTROLLER

(71) Applicant: Backbone Labs, Inc., Vancouver, WA (US)

(72) Inventor: Ozhan Maker, San Diego, CA (US)

(73) Assignee: Backbone Labs, Inc., Vancouver, WA (US)

(*) Notice: Subject to any disclaimer, the term of this patent is extended or adjusted under 35 U.S.C. 154(b) by 0 days.

(21) Appl. No.: 18/224,508

(22) Filed: Jul. 20, 2023

(65) Prior Publication Data

US 2023/0356076 A1 Nov. 9, 2023

Related U.S. Application Data

(63) Continuation-in-part of application No. 17/504,299, filed on Oct. 18, 2021, which is a continuation-in-part of application No. 16/808,339, filed on Mar. 3, 2020, now Pat. No. 11,389,721.

(51) Int. Cl.
*A63F 13/285* (2014.01)
*A63F 13/214* (2014.01)
*A63F 13/24* (2014.01)
*A63F 13/92* (2014.01)

(52) U.S. Cl.
CPC ........ *A63F 13/285* (2014.09); *A63F 13/214* (2014.09); *A63F 13/24* (2014.09); *A63F 13/92* (2014.09)

(58) Field of Classification Search
CPC ...... A63F 13/285; A63F 13/214; A63F 13/24; A63F 13/92
See application file for complete search history.

(56) References Cited

U.S. PATENT DOCUMENTS

| 4,636,593 | A  | 1/1987  | Novak  |
|-----------|----|---------|--------|
| 6,238,289 | B1 | 5/2001  | Sobota |
| 6,640,268 | B1 | 10/2003 | Kumar  |
| 6,684,062 | B1 | 1/2004  | Gosior |

(Continued)

FOREIGN PATENT DOCUMENTS

| CA | 3169951 A1   | 9/2021 |
|----|--------------|--------|
| CN | 101739162 A  | 6/2010 |

(Continued)

OTHER PUBLICATIONS

International Search Report and Written Opinion of the International Searching Authority issued in International Application No. PCT/US2021/019941, dated Jun. 9, 2021 (12 pages).

(Continued)

*Primary Examiner* — Peter J Iannuzzi (74) *Attorney, Agent, or Firm* — Crowell & Moring LLP (57) ABSTRACT

A handheld game controller having a handle and a bumper assembly on the handle. The bumper assembly includes a bumper and a haptic actuator. The bumper is configured to accept touch inputs from a user. The haptic actuator includes at least one plate and a piezoelectric actuator. The piezoelectric actuator is configured to receive an electrical signal, convert the electrical signal to mechanical motion, translate the mechanical motion to the at least one plate, and cause the at least one plate and the bumper to vibrate.

20 Claims, 4 Drawing Sheets

(56) References Cited

U.S. PATENT DOCUMENTS

| | | |
|---|---|---|
| 6,761,462 B2 | 7/2004 | Yoshida |
| 6,965,368 B1 | 11/2005 | Andrews et al. |
| 7,477,239 B2 | 1/2009 | Ray |
| 7,580,728 B2 | 8/2009 | Vance et al. |
| 7,905,627 B2 | 3/2011 | Chiang |
| 8,462,810 B2 | 6/2013 | Spinar |
| 8,760,394 B2 | 6/2014 | Chiang |
| 8,822,851 B2 | 9/2014 | Walker |
| 9,053,243 B2 | 6/2015 | Townsend |
| 9,677,740 B2 | 6/2017 | Steiner |
| 10,025,644 B2 | 7/2018 | Iwaya et al. |
| 10,258,876 B2 | 4/2019 | Wells et al. |
| 10,259,384 B2 | 4/2019 | Teng |
| 10,300,386 B1 | 5/2019 | Leung et al. |
| 10,483,969 B2 | 11/2019 | Kontani |
| 10,599,233 B1 | 3/2020 | Amalou |
| 10,725,557 B2 | 7/2020 | Kontani |
| 10,741,215 B1 | 8/2020 | Sundareson |
| 10,868,436 B1 | 12/2020 | Chen et al. |
| 11,000,759 B2 | 5/2021 | Palmer et al. |
| 11,090,557 B2 | 8/2021 | Downs et al. |
| 11,105,969 B2 | 8/2021 | Sasagawa |
| 11,389,721 B2 | 7/2022 | Khaira et al. |
| 11,662,855 B1 | 5/2023 | Sorensen et al. |
| 11,707,670 B2 | 7/2023 | Khaira et al. |
| 11,826,642 B2 | 11/2023 | Khaira et al. |
| 11,839,810 B2 | 12/2023 | Khaira et al. |
| 11,853,505 B1 | 12/2023 | Sorensen et al. |
| 2002/0173354 A1 | 11/2002 | Winans |
| 2005/0017953 A1 | 1/2005 | Pekka |
| 2005/0172045 A1 | 8/2005 | Bermudez et al. |
| 2005/0243585 A1 | 11/2005 | Marchant |
| 2005/0247550 A1 | 11/2005 | Hamada |
| 2006/0132458 A1 | 6/2006 | Garfio |
| 2006/0234794 A1 | 10/2006 | Baseflug et al. |
| 2006/0236002 A1 | 10/2006 | Valenci |
| 2007/0152965 A1 | 7/2007 | Krzyzanowski |
| 2007/0155511 A1 | 7/2007 | Grundstedt |
| 2007/0236959 A1 | 10/2007 | Tolbert |
| 2008/0202907 A1 | 8/2008 | Kyowski |
| 2008/0294453 A1 | 11/2008 | Baird-Smith |
| 2009/0065337 A1 | 3/2009 | Chiang |
| 2009/0077277 A1 | 3/2009 | Vidal |
| 2009/0219734 A1 | 9/2009 | Sawada |
| 2009/0284397 A1 | 11/2009 | Lee |
| 2010/0067424 A1 | 3/2010 | Sun |
| 2010/0115050 A1 | 5/2010 | Sultenfuss |
| 2010/0137033 A1 | 6/2010 | Lee |
| 2010/0271839 A1 | 10/2010 | Chan |
| 2011/0014984 A1* | 1/2011 | Penman .................. A63F 13/34 463/42 |
| 2011/0084904 A1 | 4/2011 | Tan |
| 2012/0145522 A1 | 6/2012 | Lee |
| 2012/0200475 A1 | 8/2012 | Baker |
| 2012/0225258 A1 | 9/2012 | Hill |
| 2013/0033829 A1 | 2/2013 | Furubo et al. |
| 2013/0077346 A1 | 3/2013 | Chen |
| 2013/0191625 A1 | 7/2013 | Mullens et al. |
| 2013/0225288 A1 | 8/2013 | Levin et al. |
| 2013/0237322 A1 | 9/2013 | Sobel |
| 2014/0018173 A1 | 1/2014 | Urhman |
| 2014/0024392 A1 | 1/2014 | Su |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0274394 A1 | 9/2014 | Willis |
| 2014/0304494 A1 | 10/2014 | Hawver |
| 2014/0317329 A1 | 10/2014 | Barnett et al. |
| 2014/0375545 A1 | 12/2014 | Ackerman et al. |
| 2015/0018101 A1 | 1/2015 | Schoenith et al. |
| 2015/0031452 A1 | 1/2015 | Rundell |
| 2015/0128042 A1 | 5/2015 | Churchill et al. |
| 2015/0217191 A1 | 8/2015 | Yan |
| 2015/0273325 A1* | 10/2015 | Falc .................. A63F 13/24 463/37 |
| 2015/0281422 A1 | 10/2015 | Kessler et al. |
| 2016/0132114 A1* | 5/2016 | Rihn .................. G06F 3/016 345/156 |
| 2016/0180811 A1 | 6/2016 | Colenbrander |
| 2016/0317919 A1 | 11/2016 | Gassoway et al. |
| 2016/0329533 A1 | 11/2016 | Tajima |
| 2017/0056762 A1 | 3/2017 | Gafni |
| 2017/0205881 A1 | 7/2017 | Yamashita |
| 2018/0004250 A1 | 1/2018 | Barnett et al. |
| 2018/0056176 A1 | 3/2018 | Sakamoto |
| 2018/0133594 A1 | 5/2018 | Guo |
| 2018/0250588 A1 | 9/2018 | Winick |
| 2018/0345136 A1 | 12/2018 | Schmitz et al. |
| 2018/0369692 A1 | 12/2018 | Winick |
| 2019/0079584 A1* | 3/2019 | Bonanno .............. G06F 3/03543 |
| 2019/0080549 A1 | 3/2019 | Lewis |
| 2019/0230400 A1 | 7/2019 | Van Os |
| 2019/0358534 A1 | 11/2019 | Fang et al. |
| 2019/0379231 A1 | 12/2019 | Gonzalez et al. |
| 2020/0155928 A1 | 5/2020 | Guo |
| 2020/0206636 A1 | 7/2020 | Schultz et al. |
| 2020/0278758 A1 | 9/2020 | McAllen |
| 2020/0282309 A1 | 9/2020 | Liao |
| 2020/0353351 A1 | 11/2020 | Mao |
| 2020/0353369 A1 | 11/2020 | Esselstrom et al. |
| 2020/0406140 A1 | 12/2020 | Sundareson |
| 2021/0093951 A1 | 4/2021 | Mahlmeister et al. |
| 2021/0104907 A1 | 4/2021 | Chen et al. |
| 2021/0154584 A1 | 5/2021 | O'Connor et al. |
| 2021/0197082 A1 | 7/2021 | Seibert et al. |
| 2021/0275907 A1 | 9/2021 | Khaira et al. |
| 2021/0308566 A1 | 10/2021 | Kong et al. |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0096923 A1 | 3/2022 | O'Leary et al. |
| 2022/0135273 A1 | 5/2022 | Malone |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith et al. |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2023/0271082 A1 | 8/2023 | Khaira et al. |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 208636809 U | 3/2019 |
| CN | 209392718 U | 9/2019 |
| CN | 113426104 A | 9/2021 |
| CN | 115427123 A | 12/2022 |
| CN | 115427123 B | 2/2024 |
| EP | 1380324 A1 | 1/2004 |
| EP | 1380324 B1 | 9/2005 |
| EP | 2025369 A2 | 2/2009 |
| EP | 2136225 A1 | 12/2009 |
| EP | 2136225 B1 | 6/2012 |
| EP | 4114540 A1 | 1/2023 |
| GB | 2608588 A * | 1/2023 ............... G06F 3/02 |
| JP | 2004139847 A | 5/2004 |
| JP | 2014210079 A | 11/2014 |
| JP | 2023516421 A | 4/2023 |
| TW | 201016020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO2021/178242 A1 | 9/2021 |
| WO | WO2022/161834 A1 | 8/2022 |

(56) References Cited

FOREIGN PATENT DOCUMENTS

| WO | WO2023/034596 A1 | 3/2023 |
|----|------------------|--------|
| WO | WO2023/172202 A1 | 9/2023 |
| WO | WO2024/006587 A1 | 1/2024 |

OTHER PUBLICATIONS

Notice of allowance in U.S. Appl. No. 17/856,895, dated Apr. 16, 2024.
Office Action in U.S. Appl. No. 18/405,077, dated May 7, 2024.
International Search Report and Written Opinion of the International Searching Authority issued in International Application No. PCT/US2024/010404, mailed Apr. 24, 2024 (16 pages).
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/866,166, filed Jul. 2022, Khaira et al.
U.S. Appl. No. 17/866,234, filed Jul. 2022, Khaira et al.
U.S. Appl. No. 17/987,772, filed Nov. 2022, Sorensen.
U.S. Appl. No. 18/076,121, filed Dec. 2022, Donlan et al.
U.S. Appl. No. 18/076,146, filed Dec. 2022, Wei et al.
U.S. Appl. No. 18/076,172, filed Dec. 2022, Chow et al.
U.S. Appl. No. 18/086,077, filed Dec. 2022, Maker.
U.S. Appl. No. 18/086,103, filed Dec. 2022, Maker.
U.S. Appl. No. 18/136,509, filed Apr. 2023, O'Connor.
U.S. Appl. No. 18/138,377, filed Apr. 2023, Sorensen et al.
U.S. Appl. No. 18/195,152, filed May 2023, Khaira.
U.S. Appl. No. 18/202,755, filed May 2023, Aldridge et al.
U.S. Appl. No. 18/214,917, filed Jun. 2023, O'Connor.
U.S. Appl. No. 18/214,949, filed Jun. 2023, O'Connor.
U.S. Appl. No. 18/226,883, filed Jul. 2023, Khaira et al.
U.S. Appl. No. 18/226,892, filed Jul. 2023, Boegli.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 17/856,895, dated Mar. 12, 2024.

Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2023/031919, mailed Nov. 17, 2023 (14 pages).
International Search Report and Written Opinion of the International Searching Authority issued in International Application No. PCT/US2023/036609, mailed Feb. 12, 2024 (15 pages).
International Search Report and Written Opinion of the International Searching Authority issued in International Application No. PCT/US2023/079518, mailed Feb. 9, 2024 (12 pages).
International Search Report and Written Opinion of the International Searching Authority, issued in International Application No. PCT/US2020/061291, mailed Feb. 24, 2021, 20 pages.
"AVPictureInPictureController: A controller that responds to user-initiated Picture in Picture playback of video in a floating, resizable window"; Apple Developer Documentation, AVKit; downloaded from the Internet on Nov. 27, 2022 at https://developer.apple.com/documentation/avkit/avpictureinpicturecontroller; Apple Inc.; 2022; 8 pages.
"Backbone—Next-Level Play"; Apple App Store preview; downloaded from the Internet on Nov. 29, 2022 at https://apps.apple.com/US/app/backbone-next-level-play/id1449660663; Apple Inc.; 2022; 4 pages.
"Backbone One"; Mobile gaming hardware product page; Backbone; Dec. 9, 2022; 7 pages.
"Digital Depth: ALL Controller Universal & Fully Customizable"; Kickstarter project page for customizable game controller; Digital Depth Inc.; Aug. 4, 2021; 25 pages.
"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.
"Game Center"; Apple Developer Game Center overview; downloaded from the Internet on Nov. 29, 2022 at https://developer.apple.com/game-center/; Apple Inc.; 2022; 4 pages.
"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.
"GitHub—Kofktu/PIPKit: Picture in Picture for iOS"; downloaded from the Internet on Nov. 27, 2022 at https://github.com/Kofktu/PIPKit; GitHub, Inc.; 2022; 11 pages.
"How to implement Picture in Picture Webview on IOS Swift?"; StackOverflow Questions; downloaded from the Internet on Nov. 28, 2022 at https://stackoverflow.com/questions/69565199/how-to-implement-picture-in-picture-webview-on-ios-swift; StackOverflow; Oct. 14, 2021; 2 pages.
"PhoneJoy Play: Turn your phone into a console!"; Kickstarter project page for compact gamepad; PhoneJoy Solutions America, Inc.; Jul. 29, 2014; 42 pages.
"Picture-in-picture (PiP) support"; Android Developers UI Guide; downloaded from the Internet on Nov. 27, 2022 at https://developer.android.com/develop/ui/views/picture-in-picture; Nov. 11, 2022; 10 pages.
"Picture-in-Picture API—Web APIs / MDN"; downloaded from the Internet on Nov. 27, 2022 at https://developer.mozilla.org/en-US/docs/Web/API/Picture-in-Picture_API; Mozilla Corporation; Oct. 10, 2022; 4 pages.
"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.
"Rayz Pro"; Pioneer Rayz™ Pro earbuds product page; downloaded from the Internet on Aug. 16, 2023 at Rayz Pro Earphone—Pioneer Rayz; Pioneer Rayz; 2023; 9 pages.
"User Notification: Push user-facing notifications to the user's device from a server, or generate them locally from your app";

(56) References Cited

OTHER PUBLICATIONS

Apple Developer Documentation; downloaded from the Internet on Nov. 28, 2022 at https://developer.apple.com/documentation/usernotifications; 2022; 16 pages.

"Why queue in geforce now so long? I try to answer for this question" Reddit, GeForceNOW comments; downloaded from the Internet on Jun. 7, 2023 at why queue in geforce now so long? I try to answer for this question : r/GeForceNOW (reddit.com); Reddit Inc.; Jun. 1, 2023; 6 pages.

Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.

Box.co.uk; "How Does the Samsung Gaming Hub Work?"; YouTube product tutorial; downloaded from the Internet on Nov. 29, 2022 at https://www.youtube.com/watch?v=uAT4tZR3mNk; YouTube; Oct. 2022; 5 pages.

Dickinson, "Instant Replay; Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.

Faulkner, C.; "Backbone's excellent phone controller is now shipping for Android" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022; 20 pages.

Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27, 2021; 12 pages.

Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox Cloud Gaming 'Lots of people are playing' Fix: Why is queue taking so long?—GameRevolution; Game Revolution; Dec. 13, 2021; 6 pages.

Max Tech; Backbone One Review—The Best iPhone Gaming Controller!; YouTube product review video; downloaded from the Internet on Nov. 29, 2022 at https://www.youtube.com/watch?v=zRJQjt2nzDo; YouTube; Jun. 2022; 4 pages.

Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.

Schofield, T.; "Logitech G Cloud Unboxing and Hands On!"; YouTube product review video; downloaded from the Internet on Nov. 29, 2022 at https://www.youtube.com/watch?v=speoPL5vqX0; YouTube; Nov. 2022; 3 pages.

Sholtz, M.; "The Razer Kishi V2 offers a new Virtual Controller mode, and it's pretty slick"; Android Police Newsletter article; downloaded from the Internet on Aug. 16, 2023 at The Razer Kishi V2 offers a new Virtual Controller mode, and it's pretty slick (androidpolice.com); Jan. 21, 2023; 7 pages.

Tech & Design; "How to Set Up New Nintendo Switch | Beginners Guide | First Time Turning On"; YouTube product review video; downloaded from the Internet on Nov. 29, 2022 at https://www.youtube.com/watch?v=XtMcQ9IAkCc; YouTube; 2021; 4 pages.

Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.

Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a-revitalized-game-center-exploring-apples-2020-gaming-updates/; MacStories, Inc.; Aug. 27, 2020; 14 pages.

Wagner, "Developing Your Own Replay System," Feb. 4, 2004, Retrieved from the Internet: URL: http://www.jamasutra.com/features/20040204/wagner_01.shtml [retrieved on Oct. 9, 2007], 11 pages.

Notice of allowance in U.S. Appl. No. 17/504,299, dated Apr. 15, 2024.

Notice of allowance in U.S. Appl. No. 18/076,146, dated Apr. 15, 2024.

Notice of allowance in U.S. Appl. No. 18/086,103, dated Mar. 25, 2024.

Notice of allowance in U.S. Appl. No. 18/086,103, dated Apr. 3, 2024.

Office Action in U.S. Appl. No. 17/504,260, dated Mar. 21, 2024.

Office Action in U.S. Appl. No. 17/504,299, dated Mar. 22, 2024.

Office Action in U.S. Appl. No. 18/195,152, dated Mar. 26, 2024.

International Search Report and Written Opinion of the International Searching Authority issued in International Application No. PCT/US2023/036567, mailed Mar. 11, 2024 (18 pages).

International Search Report and Written Opinion of the International Searching Authority issued in International Application No. PCT/US2023/081101, mailed Mar. 11, 2024 (19 pages).

Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].

Notice of allowance in U.S. Appl. No. 17/504,283, dated May 29, 2024.

Notice of allowance in U.S. Appl. No. 17/504,299, dated Jun. 12, 2024.

Notice of allowance in U.S. Appl. No. 17/856,895, dated Jun. 12, 2024.

Notice of allowance in U.S. Appl. No. 18/076,146, dated Jun. 13, 2024.

Notice of allowance in U.S. Appl. No. 18/086,103, dated May 28, 2024.

International Search Report and Written Opinion of the International Searching Authority issued in International Application No. PCT/US2023/079521, mailed May 24, 2024 (15 pages).

Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.

* cited by examiner

HAPTICS FOR TOUCH-INPUT HARDWARE INTERFACES OF A GAME CONTROLLER

CROSS-REFERENCES TO RELATED APPLICATIONS

This patent application is a continuation-in-part of application Ser. No. 17/504,299 filed Oct. 18, 2021, which is a continuation-in-part of application Ser. No. 16/808,339 filed Mar. 3, 2020, now U.S. Pat. No. 11,389,721, application Ser. Nos. 16/808,339 and 17/504,299 are each incorporated into the present disclosure by this reference.

TECHNICAL FIELD

The subject matter is related to an apparatus and methods for providing haptic feedback in a handheld game controller.

BACKGROUND

A game controller is a device used to provide input to a video game, for example to control an object or character in the video game. The video game may be running on a computer, a specially designed gaming system, or a mobile device.

In today's electronic gaming entertainment, haptic engines for game controllers are widely used to increase feelings immersion within the video game. When a user-controlled video-game character opens a virtual door in game, this action can be assigned through hooks in the game software to actuate haptic feedback within the gaming device. The tactile sensation in the game player's fingertip is interpreted by the game player's brain to associate it with, in this example, the heft of the door opening. This helps to promote immersion of the game player into the game.

Conventional haptic engines for game controllers are generally of two types: eccentric rotating mass (ERM) and linear resonant actuator (LRA). The ERM-type of haptic engine includes a mass attached to a motor shaft, where the mass is not evenly distributed around the shaft. Thus, when the motor shaft rotates the mass, it causes the device to which the ERM haptic engine is attached to shake. The LRA-type of haptic engine creates vibration by moving a mass in a reciprocal manner by means of a voice-coil drive pushing the mass against a spring. The spring tends to resist the motion of the mass and push the mass back toward its starting point.

Configurations of the disclosed technology address shortcomings in the prior art.

DETAILED DESCRIPTION

As described herein, aspects are directed to an apparatus and method for providing haptic feedback in a handheld game controller. In configurations, a handheld game controller includes a haptic actuator as part of the assembly for a touch-input hardware interface. The touch-input hardware interface may be, for example, a bumper or trigger, and other examples are noted below. The haptic actuator includes a piezoelectric actuator that provides haptic feedback to the user through the touch-input hardware interface (e.g., the bumper or trigger). Additionally, configurations include capacitive touch sensor to engage and disengage the piezoelectric actuator in response to the user's touch. Also, in configurations having more than one piezoelectric actuator on a given touch-input hardware interface (e.g., a bumper or trigger), the separate piezoelectric actuators may be engaged simultaneously or at separate times (and perhaps in a certain sequence) to provide different types of haptic feedback to the user's finger. In addition to the benefits just noted, configurations of the disclosed technology help to differentiate haptics coming from a haptic engine in the mobile device from the haptics generated from within the game controller. This is accomplished by, for example, focusing the haptic feedback on a particular part of the game controller, such as a particular bumper or trigger.

Figure 1:
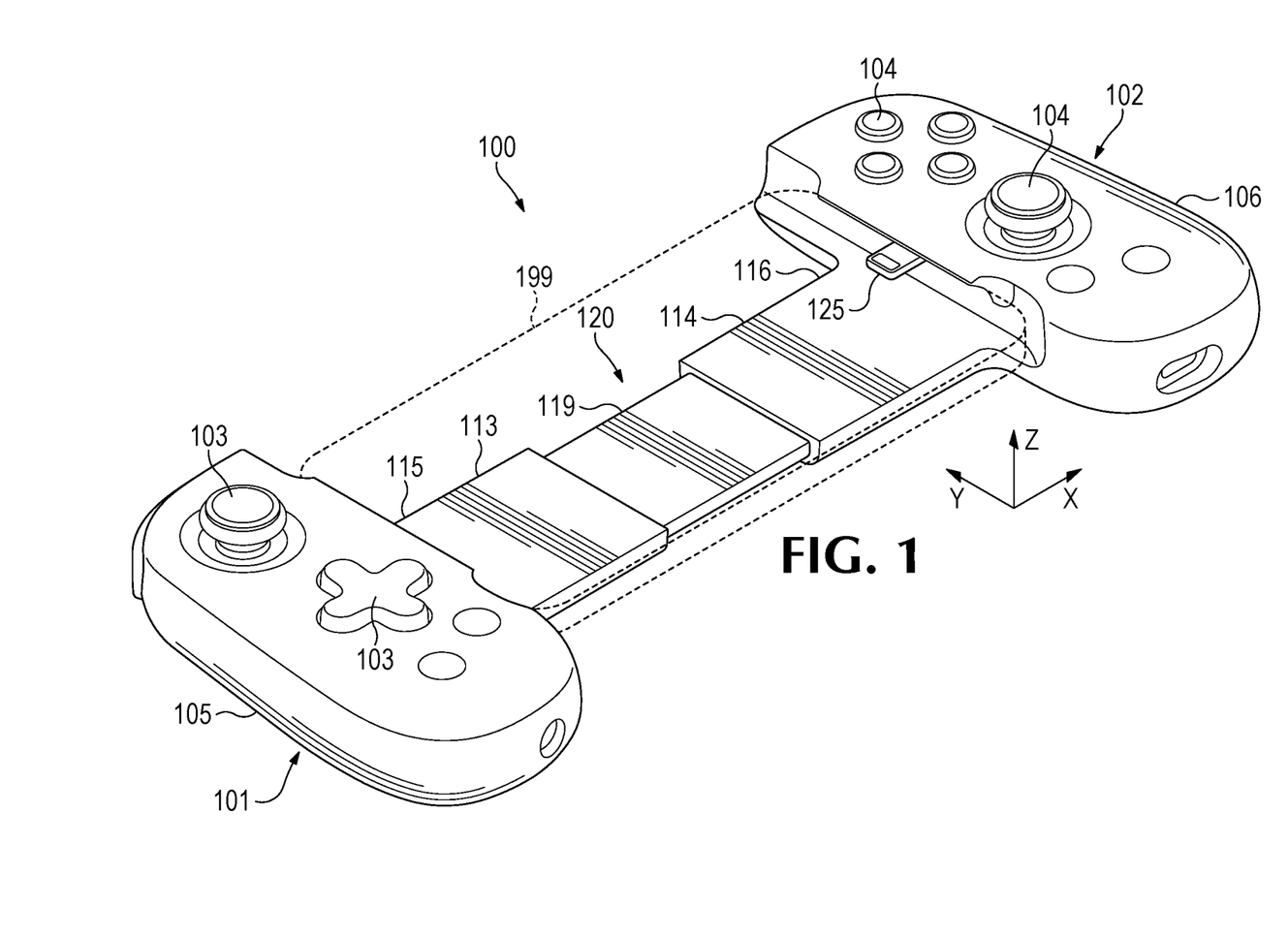
FIG. 1 is a perspective view of a handheld game controller, according to an example configuration, and illustrating an example mobile device that is secured within the handheld game controller.
Figure 2:
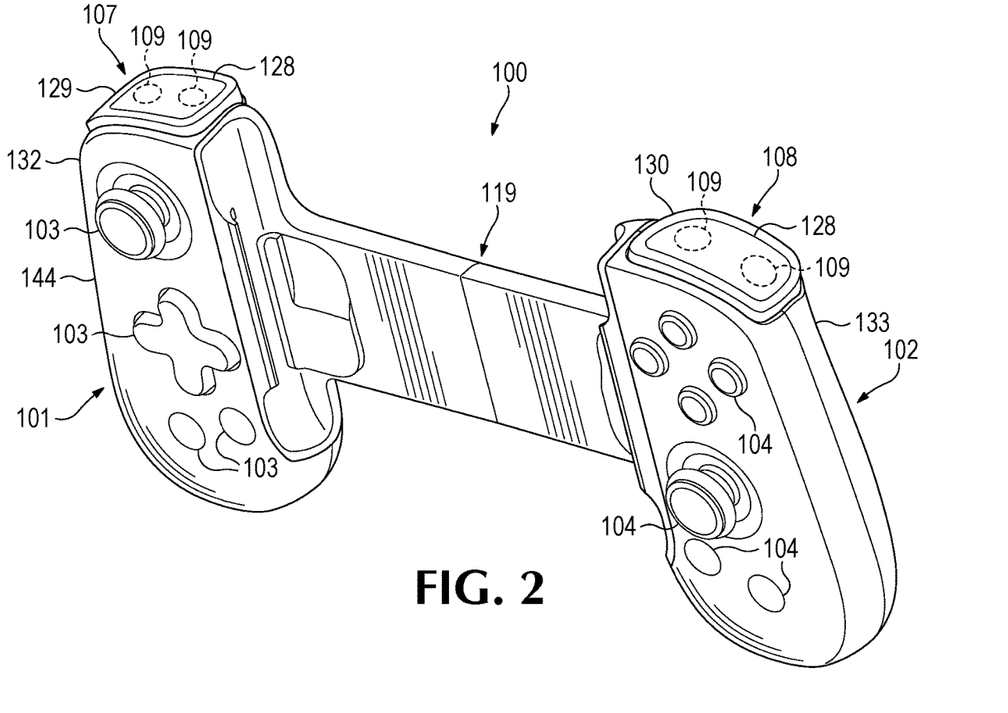
FIG. 2 is a top perspective view of the game controller of FIG. 1.

FIG. 1 is a perspective view showing portions of a handheld game controller, according to an example configuration. FIG. 2 is a top perspective view of the game controller of FIG. 1.

As illustrated in FIGS. 1 and 2, a game controller 100 may include a first handle 101, a second handle 102, and a bridge 119. Each of the first handle 101 and the second handle 102 is configured to contact and support a mobile device 199, though not all contemplated embodiments will include the second handle 102. An exemplary mobile device 199 is shown in broken lines to illustrate how the game controller 100 may contact and support a mobile device 199 in some embodiments. The mobile device 199 may be, as examples, a smartphone or a tablet computer.

As illustrated in FIGS. 1 and 2, the first handle 101 includes a guide portion 113 and a main body portion 105. The guide portion 113 extends from the main body portion 105 and along a first end 115 of the span 120 of the bridge 119. The guide portion 113 of the first handle 101 is configured to align the bridge 119 with the main body portion 105 of the first handle 101.

As illustrated, the first handle 101 includes a user-accessible, first hardware interface 103 on the main body portion 105 of the first handle 101. The first hardware interface 103 could be a button, a bumper, a trigger, an analog stick, a touchscreen, a touchpad, a knob, a slider, a switch, a wheel, a dial, a directional pad, or another such feature configured to accept touch inputs from a user's finger or a stylus. As shown in FIGS. 1 and 2, the first hardware interface 103 may include multiple such hardware interfaces.

As best illustrated in FIG. 2, the user-accessible, first hardware interface 103 may include a first touch-input hardware interface 129 coupled to the first handle 101. The first touch-input hardware interface 129 is configured to accept touch inputs from a user. For example, the user might depress the first touch-input hardware interface 129 with the user's index finger or middle finger. As illustrated, the first touch-input hardware interface 129 may be at a top edge 131 of the main body portion 105 of the first handle 101. The main body portion 105 is confined by a housing 132 of the first handle 101. As illustrated in the drawings, in configurations the first touch-input hardware interface 129 projects from the housing 132 of the first handle 101. The first touch-input hardware interface 129 may be, for example, a bumper or trigger, or it may be one of the other features noted above for the first hardware interface 103 that are configured to accept touch inputs from a user's finger or a stylus. Typically, though, the first touch-input hardware interface 129 is a mechanical input device, such as a button, a bumper, a trigger, an analog stick, a knob, a slider, a switch, a wheel, a dial, or a directional pad.

Referring to FIGS. 1 and 2 together, the second handle 102 likewise includes a guide portion 114 and a main body portion 106. The guide portion 114 extends from the main body portion 106 and along a second end 116 of the span 120 of the bridge 119. The guide portion 114 of the second handle 102 is configured to align the bridge 119 with the main body portion 106 of the second handle 102.

As illustrated, the second handle 102 further includes a user-accessible, second hardware interface 104 on the main body portion 106 of the second handle 102. As above for the first hardware interface 103 of the first handle 101, the second hardware interface 104 could be a button, a bumper, a trigger, an analog stick, a touchscreen, a touchpad, a knob, a slider, a switch, a wheel, a dial, a directional pad, or another such feature configured to accept touch inputs from a user's finger or a stylus. The second hardware interface 104 may include multiple such hardware interfaces, as illustrated in FIGS. 1 and 2.

As best illustrated in FIG. 2, the user-accessible, second hardware interface 104 may include a second touch-input hardware interface 154 coupled to the second handle 102. The second touch-input hardware interface 154 is configured to accept touch inputs from a user as described above for the first touch-input hardware interface 129. As illustrated, the second touch-input hardware interface 154 may be at a top edge of the main body portion 106 of the second handle 102. The main body portion 106 is confined by a housing 133 of the second handle 102. As illustrated in the drawings, in configurations the second touch-input hardware interface 154 projects from the housing 133 of the second handle 102. The second touch-input hardware interface 154 may be, for example, a bumper or trigger, or it may be one of the other features noted above for the second hardware interface 104 that are configured to accept touch inputs from a user's finger or a stylus. Typically, though, the second touch-input hardware interface 154 is a mechanical input device, such as a button, a bumper, a trigger, an analog stick, a knob, a slider, a switch, a wheel, a dial, or a directional pad.

One or both of the first handle 101 and the second handle 102 may include a connector 125 for physical and electrical connection to the mobile device 199. The connector 125 may be, for example, a USB-C connector.

It is noted that each of FIGS. 1, 3, 4, and 5 includes indications showing the directions of mutually orthogonal x-, y-, and z-axes. These are used to orient the reader and to assist with the descriptions of the illustrated configurations. Accordingly, the bridge 119 lies in the x-y plane as illustrated, and the intended gameplay position of the mobile device 199 is substantially parallel to the x-y plane of the bridge 119, such as is illustrated in FIGS. 1 and 3-5. As used in this context, "substantially parallel" means largely or essentially equidistant from the x-y plane at all points, without requiring perfect parallelism.

Figure 3:
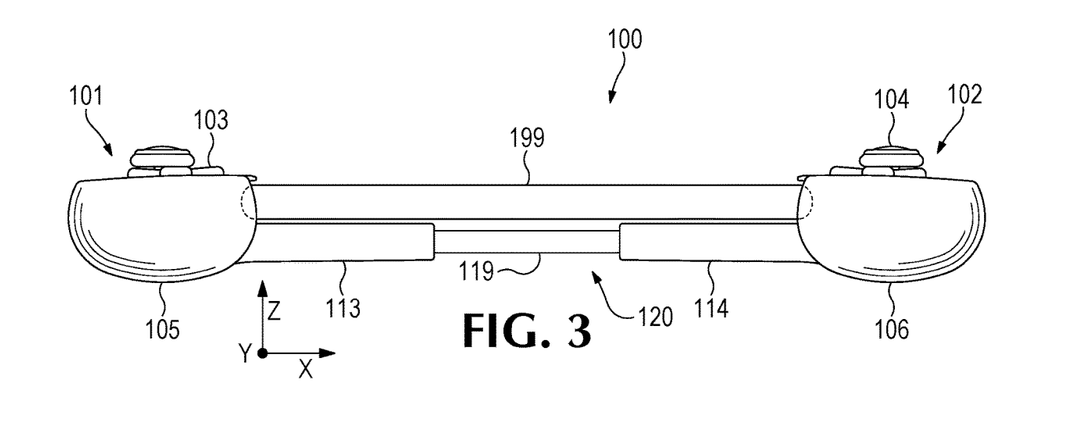
FIG. 3 is a front view of the handheld game controller of FIG. 1.
Figure 4:
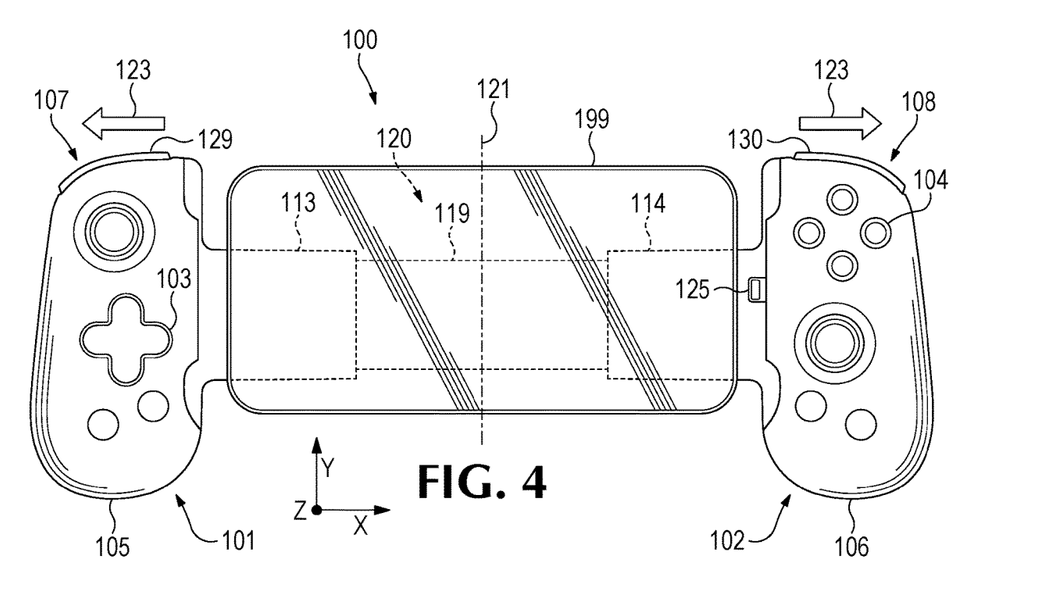
FIG. 4 is a top view of the handheld game controller of FIG. 1, shown in an example extended position.
Figure 5:
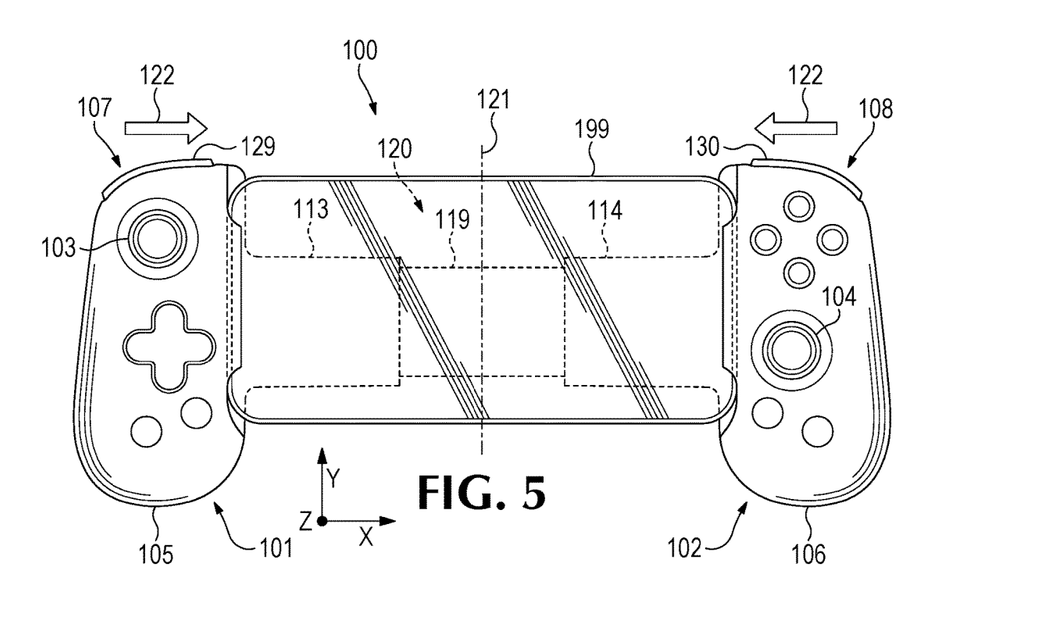
FIG. 5 is a top view of the handheld game controller of FIG. 1, shown in an example retracted position.

FIG. 3 is a front view of the handheld game controller of FIG. 1. FIG. 4 is a top view of the handheld game controller of FIG. 1, shown in an example extended position. And FIG. 5 is a top view of the handheld game controller of FIG. 1, shown in an example retracted position. FIGS. 3-5 illustrate an example of how a mobile device 199 may be installed into the game controller 100. As illustrated in FIG. 4, the mobile device 199 may be placed over the bridge 119, between the first handle 101 and the second handle 102 of the game controller 100. The connector 125 of the game controller 100 may be joined with a corresponding connector on the mobile device 199. FIG. 4 shows an example of an extended configuration of the game controller 100, where the handles are extended away from each other a sufficient distance to allow the mobile device 199 to be inserted. In FIG. 5, the mobile device 199 is secured between the first handle 101 and the second handle 102 of the game controller 100. FIGS. 3 and 5 illustrate an example of a retracted configuration of the game controller 100, where the handles are retracted toward each other such that the mobile device 199 contacts the contact zone (explained below). The extended configuration and the retracted configuration of the game controller 100 are described in more detail below.

Hence, as illustrated the bridge 119 is in sliding engagement with the first handle 101. In the illustrated configuration, the bridge 119 is not telescoping, meaning that segments of the bridge 119 do not slide within another segment of the bridge 119 to allow for lengthening or shortening of the bridge 119. The bridge 119 has a span 120 extending away from the main body portion 105 of the first handle 101, and the span 120 has a transverse midline 121.

The bridge 119 and the first handle 101 are configured to allow the main body portion 105 of the first handle 101 to translate in a retraction direction 122 toward the midline 121 of the bridge 119 and into a retracted configuration, an example of which is illustrated in FIGS. 3 and 5. The bridge 119 and the first handle 101 are configured to allow the main body portion 105 of the first handle 101 to also translate in an extension direction 123 away from the midline 121 of the bridge 119 into an extended configuration, an example of which is illustrated in FIG. 4.

As used in this disclosure, the transverse midline 121 of the bridge 119 is a reference datum used to define the extension direction 123 and the retraction direction 122. That is, the retraction direction 122 is toward the transverse midline 121, while the retraction direction 122 is away from the transverse midline 121. Accordingly, the transverse midline 121 of the bridge 119 may or may not coincide with a physical structure on the game controller 100.

Likewise, the bridge 119, as illustrated, is in sliding engagement with the second handle 102, and the span 120 of the bridge 119 extends away from the main body portion 106 of the second handle 102. The bridge 119 and the second handle 102 are configured to allow the main body portion 106 of the second handle 102 to translate in the retraction direction 122 toward the midline 121 of the bridge 119 and into the retracted configuration. The bridge 119 and the second handle 102 are configured to allow the main body portion 106 of the second handle 102 to also translate in the extension direction 123 away from the midline 121 of the bridge 119 into the extended configuration.

In configurations, the bridge 119 is configured such that the first handle 101 and the second handle 102 are equidistant from the midline 121 of the bridge 119 in the retracted configuration and in the extended configuration. In configurations, the bridge 119 is configured such that the first handle 101 and the second handle 102 are equidistant from the midline 121 of the bridge 119 when the first handle 101 and the second handle 102 are translating from the retracted configuration to the extended configuration. In configurations, the bridge 119 is configured such that the first handle 101 and the second handle 102 are equidistant from the midline 121 of the bridge 119 when the first handle 101 and the second handle 102 are translating from the extended configuration to the retracted configuration.

Figure 6:
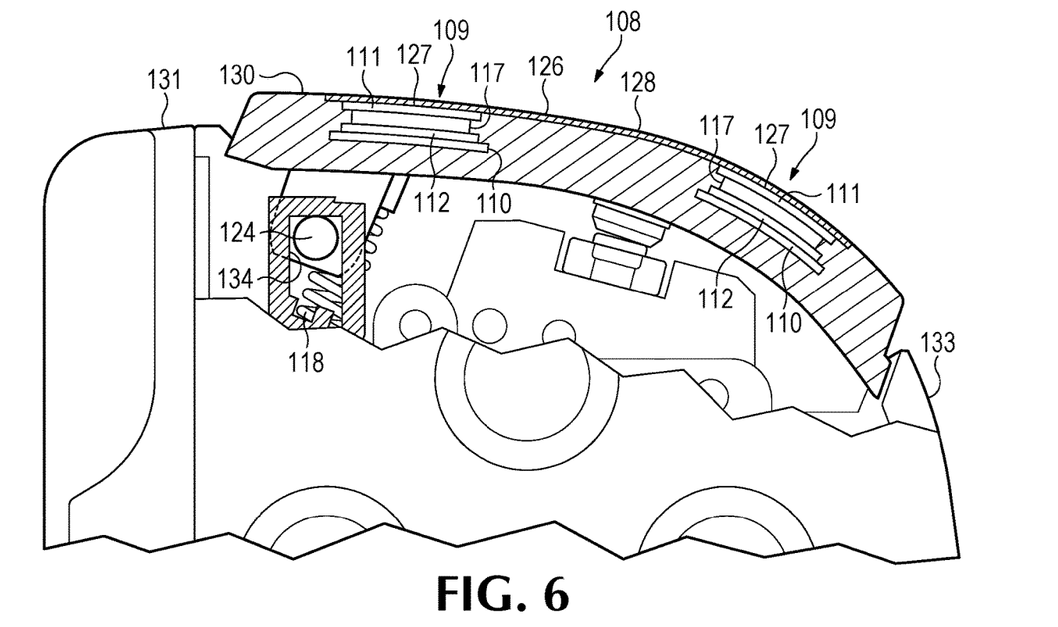
FIG. 6 is a partial sectional view of a portion of FIG. 1, illustrating an example haptic actuator embedded in the touch-input hardware interface.
Figure 7:
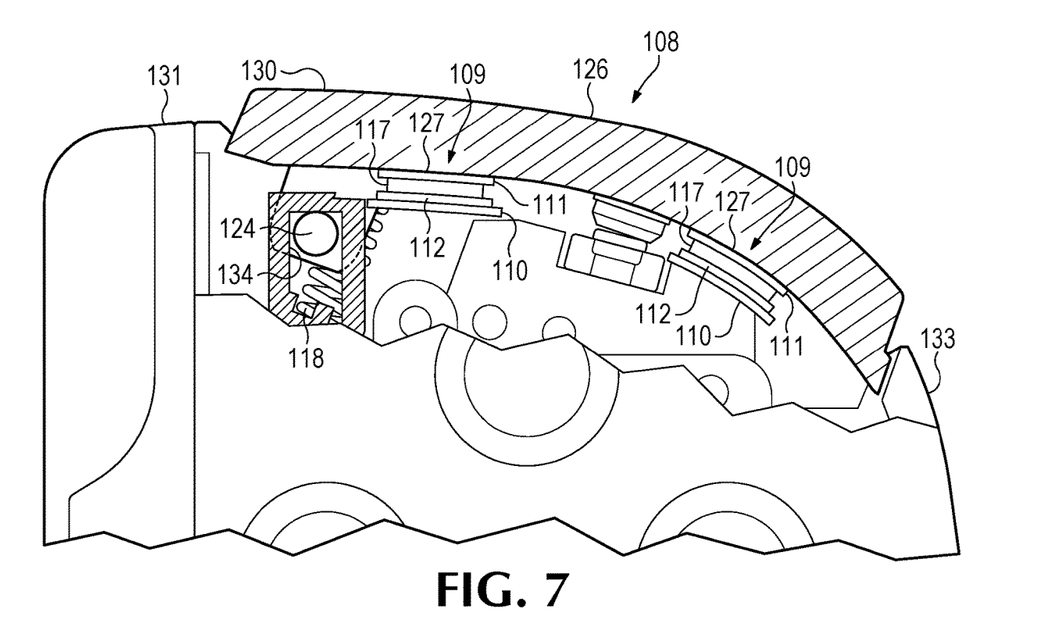
FIG. 7 is a partial sectional view of a portion of FIG. 1, illustrating an example haptic actuator in direct, physical contact with the touch-input hardware interface.

FIG. 6 is a partial sectional view of a portion of the second handle 102 of FIG. 1, illustrating an example haptic actuator 109 embedded in the second touch-input hardware interface 130. FIG. 7 is a partial sectional view of a portion of the second handle 102 of FIG. 1, illustrating an example haptic actuator 109 in direct, physical contact with the second touch-input hardware interface 130. While illustrated and described for the second handle 102, the discussion of FIGS. 6 and 7 applies also to the first handle 101. Indeed, the game controller 100 may include a touch-input assembly on one or both handles, namely the first touch-input assembly 107, which includes the first touch-input hardware interface 129, and the second touch-input assembly 108, which includes the second touch-input hardware interface 130.

As illustrated in FIGS. 6 and 7, the second touch-input assembly 108 includes a second touch-input hardware interface 130 and a haptic actuator 109.

The touch-input hardware interface is configured to accept touch inputs from a user. In configurations, the touch-input hardware interface may be, for example, a button, a bumper, a trigger, an analog stick, a knob, a slider, a switch, a wheel, a dial, or a directional pad. In the illustrated configuration, the touch-input hardware interface is a bumper or trigger that the user might depress, typically with the user's index finger or middle finger.

As illustrated, the haptic actuator 109 includes a first plate 111, a second plate 112, and a piezoelectric actuator 117. While the illustrated configuration shows two plates, the first plate 111 and the second plate 112, some configurations have just one plate and some configurations have more than two plates. As illustrated, the first plate 111, the second plate 112, and the piezoelectric actuator 117 are in layers, with the piezoelectric actuator 117 being between the first plate 111 and the second plate 112.

The piezoelectric actuator 117, or piezoelectric transducer, is configured to receive an electrical signal, convert the electrical signal to mechanical motion, translate the mechanical motion to the first plate 111 and the second plate 112, and cause the first plate 111 and the second plate 112 to vibrate. The electrical signal to the piezoelectric actuator 117 may come from, as examples, a processor within the game controller 100 or a processor within the mobile device 199. The processor within the game controller 100 may be, for example, part of a printed circuit board within the second handle 102. Vibration of the plates, in turn, causes the second touch-input hardware interface 130 to vibrate. Accordingly, the haptic actuator 109 causes haptic vibration without the use of an eccentric rotating mass (ERM) or a linear resonant actuator (LRA). ERM- and LRA-type haptic actuators 109 are too bulky for the application described here and would not allow the second touch-input assembly 108 (which includes the haptic actuator 109) to translate as a unit relative to the second handle or to focus the haptic feedback sensation (i.e. the vibrations) to a specific portion of the game controller 100, such as to the second touch-input assembly 108. In addition, ERM- and LRA-type haptic actuators 109 require more electrical power than the technologies discussed in this disclosure. Thus, the described technologies require less battery power, resulting in longer battery life, less frequent recharging of the battery, and less need to be tethered by a cord to an electrical outlet to provide power to depleted batteries.

In some example configurations, the layers of the haptic actuator 109 include a capacitive touch sensor 128, such as a capacitive touch film. The capacitive touch sensor 128 is configured to detect presence of a finger of the user on the second touch-input hardware interface 130. Such capacitive touch sensors 128 typically have a grid of electrodes that complete an electrical circuit in response to a user's touch. Accordingly, in configurations the haptic actuator 109 is "off" unless the capacitive touch sensor 128 detects a user's finger on the second touch-input hardware interface 130. If a user's finger is detected, then the haptic actuator 109 is "on" and will cause the plate(s) to vibrate in response to an electrical signal as described above. In such configurations, battery power may be conserved by not activating the haptic feedback when the user's finger is not in place on the corresponding touch-input hardware interface. As illustrated in FIG. 6, the capacitive touch sensor 128 may be affixed to the outward surface of the second touch-input hardware interface 130. The outward surface is the surface indicated as including the contact surface area 126 and coincides with the input surface (which is described below) of the second touch-input hardware interface 130. In some example configurations, the layers of the haptic actuator 109 do not include a capacitive touch sensor 128.

In configurations, the layers of the haptic actuator 109 include a flexible, printed circuit board 110. In configurations, the flexible circuit board 110 is connected via a flexible cable to the main circuit board of the game controller 100. As noted above, that main printed circuit board may be within the second handle 102, or it may be elsewhere within the game controller 100.

As illustrated in FIGS. 6 and 7, the second touch-input hardware interface 130 and the haptic actuator 109 translate as a unit relative to the handle. To accomplish that, the second touch-input assembly 108 is not rigidly coupled to the housing 133 of the second handle 102. Rather, the second touch-input assembly 108 is connected to the housing 133 through a non-rigid connection, such as through a pivot rod 124 and a spring 118 as illustrated in FIGS. 6 and 7. As used in this context, a rigid coupling would not allow the coupled components to be moved relative to each other without causing permanent damage to either component. Accordingly, in such configurations the second touch-input assembly 108 is isolated from the main body portion 106 of the second handle 106 (because of the lack of a rigid coupling between them) and, likewise, from the remainder of the game controller 100.

As illustrated, a track slot 134 is rigidly coupled to the housing 133, and the second touch-input hardware interface 130 includes a pivot rod 124. The pivot rod 124 is configured to engage the track slot 134 of the second handle 102. The pivot rod 124 is configured to rotate within the track slot 134 and to translate within the track slot 134. Accordingly, the pivot rod 124 and track slot 134 provide a dual-action coupling between the second touch-input assembly 108 and the housing 133 of the second handle 102, the two actions being rotation and translation. The spring 118 is configured to bias the second touch-input hardware interface 130 into the upward, or undepressed, position, an example of which is shown in FIGS. 6 and 7. Hence, in configurations where the haptic actuator 109 translates as a unit relative to the handle and the touch-input assembly is connected to the housing 133 through a non-rigid connection, the haptic feedback provided by the haptic actuator 109 may be focused on a particular part of the game controller (namely the second touch-input hardware interface 130 to which the particular haptic actuator 109 is coupled) rather than the game controller as a whole.

As noted above, FIG. 6 illustrates a haptic actuator 109 that is embedded in the second touch-input hardware interface 130. As used in this context, "embedded" means that the haptic actuator 109 is snugly enclosed in the second touch-input hardware interface 130, which substantially surrounds the haptic actuator 109. As used in this context, "substantially surrounds" means largely or essentially extending around, without requiring perfect encircling. By contrast, FIG. 7 illustrates a haptic actuator 109 that, instead of being embedded in the second touch-input hardware interface 130, is in direct, physical contact with the second touch-input hardware interface 130. In the example configuration of FIG. 7, then, the haptic actuator 109 is coupled to an underside of the second touch-input hardware interface 130. In other configurations, the haptic actuator 109 could be coupled to another part of the second touch-input assembly 108. These two configurations (i.e. embedded within the second touch-input hardware interface 130 or being in direct, physical contact with the second touch-input hardware interface 130) each provide non-dampened, no-gap contact between the haptic actuator 109 and the second touch-input hardware interface 130, which transfers the mechanical force (i.e. the vibration) of the haptic actuator 109 to the input surface (i.e. where the user places their finger during typical use) of the second touch-input hardware interface 130.

As best illustrated in FIGS. 2, 6, and 7, the second touch-input hardware interface 130 has a contact surface area 126 of an outward surface of the second touch-input hardware interface 130. The outward surface of the second touch-input hardware interface 130 is configured to receive touch inputs from the user and coincides with the input surface of the second touch-input hardware interface 130. The haptic actuator 109 has a planform area 127 in the y-axis. For the illustrated configuration, this planform area 127 is indicated by the dashed-line circles 109 in FIG. 2. (The planform area 127 is shown from the side in FIGS. 6 and 7.) In configurations, the planform area 127 of the haptic actuator 109 is less than the contact surface area 126 of the outward surface of the second touch-input hardware interface 130.

In configurations, a single touch-input hardware interface may include more than one haptic actuator 109. The haptic actuators 109 may be spaced apart to provide haptic feedback (i.e. vibrations) to different parts of the input surface. While FIG. 2 shows an example of the touch-input hardware interfaces each having two haptic actuators 109, other configurations could have more than two haptic actuators 109. For example a single touch-input hardware interface may include four haptic actuators 109 arranged at the corners of a rectangular shape. In configurations having more than one haptic actuator 109 on a single touch-input hardware interface, the haptic actuators 109 can be activated and deactivated individually. Accordingly, the haptic actuators 109 can be turned "on" and "off" separately (including in a particular sequence). Thus, while conventional systems either have the haptics on or off, configurations of the disclosed technology provide a range of haptic feedback by engaging one haptic actuator 109 on a touch-input hardware interface (e.g. a bumper or trigger), multiple haptic actuators 109 on the same touch-input hardware interface simultaneously, or multiple haptic actuators 109 on the same touch-input hardware interface individually (including sequentially). Engaging the haptic actuators 109 sequentially may provide, for example, a sense of movement to the user. Additionally, engaging more than one of the haptic actuators 109 at the same time may provide, for example, a sense of stronger force to the user as compared to when fewer haptic actuators 109 are engaged.

Although described with respect to the illustrated bumper, it is recognized that the disclosed haptics technology could be applied to other types of user-accessible, touch-input hardware interfaces such as, for example, a button, an analog stick, a touchscreen, a touchpad, a knob, a slider, a switch, a wheel, a dial, a directional pad, and a trigger.

In use, the user holds the game controller in the customary way. That typically means holding each handle with the user's thumbs available to activate the hardware interfaces 103, 104 (e.g., buttons, joysticks, etc.) on the front side of the handles 101, 102. The user's index or middle finger is typically available to activate the touch-input hardware interfaces 129, 130 (e.g. the bumpers, triggers, etc.) at the top edge 131 of the handle 101, 102. With the user's finger(s) resting on the touch-input hardware interface(s), in configurations having the capacitive touch sensor 128, the capacitive touch sensor 128 would detect the presence of the user's finger and send a signal, either directly to the corresponding haptic actuator 109 or to another processor, to turn the haptic actuator 109 "on" so that it will vibrate in response to a received electrical signal indicative of when haptic feedback should occur during gameplay. As noted, each touch-input hardware interface may have more than one haptic actuator 109. In such configurations, the haptic actuators 109 can be controlled separately to provide haptic feedback to the user that is more complex and immersive than (a) the haptics provided by the mobile device itself, (b) a single haptic engine rigidly coupled to the housing of the game controller, or (c) a single haptic actuator 109 for the particular touch-input hardware interface.

EXAMPLES

Illustrative examples of the disclosed technologies are provided below. A particular configuration of the technologies may include one or more, and any combination of, the examples described below.

Example 1 includes a handheld game controller comprising: a handle; and a bumper assembly on the handle, the bumper assembly comprising: a bumper configured to accept touch inputs from a user, and a haptic actuator comprising at least one plate and a piezoelectric actuator configured to receive an electrical signal, convert the electrical signal to mechanical motion, translate the mechanical motion to the at least one plate, and cause the at least one plate and the bumper to vibrate.

Example 2 includes the handheld game controller of Example 1, in which the bumper assembly is configured to translate as a unit relative to the handle.

Example 3 includes the handheld game controller of any of Examples 1-2, in which the handle further comprises a housing from which the bumper projects, and in which the bumper assembly is not rigidly coupled to the housing.

Example 4 includes the handheld game controller of Example 3, in which the bumper assembly is connected to the housing through at least one spring and at least one pivot.

Example 5 includes the handheld game controller of any of Examples 1-4, in which the bumper has a contact surface area of an outward surface of the bumper, the outward surface of the bumper being configured to receive touch inputs from the user, the haptic actuator having a planform area, the planform area of the haptic actuator being less than the contact surface area of the outward surface of the bumper.

Example 6 includes the handheld game controller of any of Examples 1-5, in which the haptic actuator further includes a capacitive touch sensor configured to detect presence of a finger of the user on the bumper.

Example 7 includes the handheld game controller of any of Examples 1-6, in which the haptic actuator does not include an eccentric rotating mass or a linear resonant actuator to cause vibration.

Example 8 includes the handheld game controller of any of Examples 1-7, in which the haptic actuator comprises layers, the layers including a first plate; a second plate; and the piezoelectric actuator; the piezoelectric actuator being between the first plate and the second plate, the piezoelectric actuator configured to receive the electrical signal and mechanically vibrate the first plate and the second plate in response to the electrical signal.

Example 9 includes the handheld game controller of Example 8, the layers of the haptic actuator further including a capacitive touch sensor configured to detect presence of a finger of the user on the bumper.

Example 10 includes the handheld game controller of any of Examples 1-9, in which the haptic actuator is in direct, physical contact with the bumper.

Example 11 includes the handheld game controller of any of Examples 1-10, in which the haptic actuator is embedded in the bumper.

Example 12 includes the handheld game controller of any of Examples 1-11, in which the handle is a first handle, the handheld game controller further comprising: a second handle; a bridge connecting the first handle and the second handle; a second bumper assembly on the second handle, the second bumper assembly comprising: a second bumper configured to accept touch inputs from the user, and a second haptic actuator comprising at least one plate and a piezoelectric actuator configured to receive an electrical signal, convert the electrical signal to mechanical motion, translate the mechanical motion to the at least one plate of the second haptic actuator, and cause the at least one plate of the second haptic actuator and the second bumper to vibrate.

Example 13 includes the handheld game controller of Example 12, in which the bridge is in sliding engagement with the first handle and the second handle, the bridge having a span extending away from the first handle, the span having a transverse midline, the midline of the bridge being between the first handle and the second handle, the bridge and the first handle being configured for the first handle to translate in a retraction direction toward the midline of the bridge and into a retracted configuration and also to translate in an extension direction away from the midline of the bridge into an extended configuration, the bridge and the second handle being configured for the second handle to translate along the bridge in the retraction direction toward the midline of the bridge and into the retracted configuration and also to translate in the extension direction away from the midline of the bridge and into the extended configuration.

Example 14 includes the handheld game controller of any of Examples 1-13, further comprising a mobile device contacted and supported by the first handle and the second handle.

Example 15 includes the handheld game controller of any of Examples 1-14, in which the haptic actuator is a plurality of haptic actuators, each haptic actuator of the plurality of haptic actuators comprising at least one plate and a piezoelectric actuator configured to receive an electrical signal, convert the electrical signal to mechanical motion, translate the mechanical motion to the at least one plate, and cause the at least one plate and the bumper to vibrate, each haptic actuator of the plurality of haptic actuators being separably controllable to turn off and on independently of another haptic actuator of the plurality of haptic actuators.

Example 16 includes a handheld game controller comprising: a handle; and a touch-input assembly on the handle, the touch-input assembly comprising: a touch-input hardware interface configured to accept touch inputs from a user, and a haptic actuator comprising at least one plate and a piezoelectric actuator configured to receive an electrical signal, convert the electrical signal to mechanical motion, translate the mechanical motion to the at least one plate, and cause the at least one plate to vibrate.

Example 17 includes the handheld game controller of Example 16, in which the touch-input assembly is configured to translate as a unit relative to the handle.

Example 18 includes the handheld game controller of any of Examples 16-17, in which the handle further comprises a housing from which the touch-input hardware interface projects, and in which the touch-input assembly is not rigidly coupled to the housing.

Example 19 includes the handheld game controller of any of Examples 16-18, in which the haptic actuator does not include an eccentric rotating mass or a linear resonant actuator to cause vibration.

Example 20 includes the handheld game controller of any of Examples 16-19, in which the haptic actuator comprises layers, the layers including: a first plate; a second plate; and a piezoelectric transducer between the first plate and the second plate, the piezoelectric transducer configured to receive an electrical signal and mechanically vibrate the first plate and the second plate in response to the electrical signal.

Example 21 includes the handheld game controller of Example 20, the layers of the haptic actuator further including a capacitive touch sensor configured to detect presence of a finger of the user on the touch-input hardware interface.

Example 22 includes the handheld game controller of any of Examples 16-21, in which the touch-input hardware interface is selected from the group consisting of a button, an analog stick, a knob, a slider, a switch, a wheel, a dial, a directional pad, and a trigger.

Aspects may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various configurations. In addition, the functionality may be embodied in whole or in part in firmware or hardware equivalents such as integrated circuits, field programmable gate arrays (FPGA), and the like. Particular data structures may be used to more effectively implement one or more aspects of the disclosed systems and methods, and such data structures are contemplated within the scope of computer executable instructions and computer-usable data described herein.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," and "left" are used for convenience and in reference to the views provided in figures. But the game controller may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

I claim:

1. A handheld game controller comprising:
   a handle; and
   a bumper assembly on the handle, the bumper assembly comprising:
      a bumper configured to accept touch inputs from a user, and
      a haptic actuator comprising at least one plate and a piezoelectric actuator configured to receive an electrical signal, convert the electrical signal to mechanical motion, translate the mechanical motion to the at least one plate, and cause the at least one plate and the bumper to vibrate;
      wherein the haptic actuator comprises layers, the layers including a first plate; a second plate; and the piezoelectric actuator; the piezoelectric actuator being between the first plate and the second plate, the piezoelectric actuator configured to receive the electrical signal and mechanically vibrate the first plate and the second plate in response to the electrical signal.

2. The handheld game controller of claim 1, in which the bumper assembly is configured to translate as a unit relative to the handle.

3. The handheld game controller of claim 1, in which the handle further comprises a housing from which the bumper projects, and in which the bumper assembly is not rigidly coupled to the housing.

4. The handheld game controller of claim 3, in which the bumper assembly is connected to the housing through at least one spring and at least one pivot.

5. The handheld game controller of claim 1, in which the bumper has a contact surface area of an outward surface of the bumper, the outward surface of the bumper being configured to receive touch inputs from the user, the haptic actuator having a planform area, the planform area of the haptic actuator being less than the contact surface area of the outward surface of the bumper.

6. The handheld game controller of claim 1, in which the haptic actuator further includes a capacitive touch sensor configured to detect presence of a finger of the user on the bumper.

7. The handheld game controller of claim 1, in which the haptic actuator does not include an eccentric rotating mass or a linear resonant actuator to cause vibration.

8. The handheld game controller of claim 1, the layers of the haptic actuator further including a capacitive touch sensor configured to detect presence of a finger of the user on the bumper.

9. The handheld game controller of claim 1, in which the haptic actuator is in direct, physical contact with the bumper.

10. The handheld game controller of claim 1, in which the haptic actuator is embedded in the bumper.

11. The handheld game controller of claim 1, in which the handle is a first handle, the handheld game controller further comprising:
    a second handle;
    a bridge connecting the first handle and the second handle;
    a second bumper assembly on the second handle, the second bumper assembly comprising:
       a second bumper configured to accept touch inputs from the user, and
       a second haptic actuator comprising at least one plate and a piezoelectric actuator configured to receive an electrical signal, convert the electrical signal to mechanical motion, translate the mechanical motion to the at least one plate of the second haptic actuator, and cause the at least one plate of the second haptic actuator and the second bumper to vibrate.

12. The handheld game controller of claim 11, in which the bridge is in sliding engagement with the first handle and the second handle, the bridge having a span extending away from the first handle, the span having a transverse midline, the mid line of the bridge being between the first handle and the second handle, the bridge and the first handle being configured for the first handle to translate in a retraction direction toward the midline of the bridge and into a retracted configuration and also to translate in an extension direction away from the mid line of the bridge into an extended configuration, the bridge and the second handle being configured for the second handle to translate along the bridge in the retraction direction toward the mid line of the bridge and into the retracted configuration and also to translate in the extension direction away from the midline of the bridge and into the extended configuration.

13. The handheld game controller of claim 1, further comprising a mobile device contacted and supported by the first handle and the second handle.

14. The handheld game controller of claim 1, in which the haptic actuator is a plurality of haptic actuators, each haptic actuator of the plurality of haptic actuators comprising at least one plate and a piezoelectric actuator configured to receive an electrical signal, convert the electrical signal to mechanical motion, translate the mechanical motion to the at least one plate, and cause the at least one plate and the bumper to vibrate, each haptic actuator of the plurality of haptic actuators being separably controllable to turn off and on independently of another haptic actuator of the plurality of haptic actuators.

15. A handheld game controller comprising:
a handle; and
a touch-input assembly on the handle, the touch-input assembly comprising:
  a touch-input hardware interface configured to accept touch inputs from a user, and
  a haptic actuator comprising at least one plate and a piezoelectric actuator configured to receive an electrical signal, convert the electrical signal to mechanical motion, translate the mechanical motion to the at least one plate, and cause the at least one plate to vibrate;
wherein the haptic actuator comprises layers, the layers including:
  a first plate;
  a second plate; and
  a piezoelectric transducer between the first plate and the second plate, the piezoelectric transducer configured to receive an electrical signal and mechanically vibrate the first plate and the second plate in response to the electrical signal.

16. The handheld game controller of claim 15, in which the touch-input assembly is configured to translate as a unit relative to the handle.

17. The handheld game controller of claim 15, in which the handle further comprises a housing from which the touch-input hardware interface projects, and in which the touch-input assembly is not rigidly coupled to the housing.

18. The handheld game controller of claim 15, in which the haptic actuator does not include an eccentric rotating mass or a linear resonant actuator to cause vibration.

19. The handheld game controller of claim 15, the layers of the haptic actuator further including a capacitive touch sensor configured to detect presence of a finger of the user on the touch-input hardware interface.

20. The handheld game controller of claim 15, in which the touch-input hardware interface is selected from the group consisting of a button, an analog stick, a knob, a slider, a switch, a wheel, a dial, a directional pad, and a trigger.

* * * * *